(12) United States Patent
Netten et al.

(10) Patent No.: US 9,023,129 B2
(45) Date of Patent: May 5, 2015

(54) HYDROMETALURGICAL PROCESS AND APPARATUS FOR RECOVERING METALS FROM WASTE MATERIAL

(75) Inventors: Jeroen Pieter Netten, 's-Gravenhage (NL); Silvan Johan Thus, Delft (NL)

(73) Assignee: Elemetal Holding B.V., Delft (NL)

( * ) Notice: Subject to any disclaimer, the term of this patent is extended or adjusted under 35 U.S.C. 154(b) by 498 days.

(21) Appl. No.: 13/500,485

(22) PCT Filed: Oct. 6, 2010

(86) PCT No.: PCT/NL2010/050657
§ 371 (c)(1),
(2), (4) Date: May 21, 2012

(87) PCT Pub. No.: WO2011/074948
PCT Pub. Date: Jun. 23, 2011

(65) Prior Publication Data
US 2012/0234137 A1    Sep. 20, 2012

(30) Foreign Application Priority Data
Oct. 6, 2009    (NL) ...................................... 2003595

(51) Int. Cl.
C22B 5/00      (2006.01)
C25C 1/00      (2006.01)
C22B 15/00     (2006.01)
C22B 7/00      (2006.01)
C22B 3/26      (2006.01)
(Continued)

(52) U.S. Cl.
CPC ............... *C22B 7/007* (2013.01); *C22B 3/0005* (2013.01); *C22B 3/02* (2013.01); *C22B 3/045* (2013.01); *C22B 3/20* (2013.01); *C25C 1/00* (2013.01)

(58) Field of Classification Search
CPC ............. C22B 3/06; C22B 3/20; C22B 3/44; C22B 7/007; C25C 1/00; C25C 1/12
USPC ............. 75/743, 726, 728; 205/560, 574, 580
See application file for complete search history.

(56) References Cited

U.S. PATENT DOCUMENTS 3,929,598 A    12/1975 Stern et al.
4,434,043 A *   2/1984 Singhal et al. ................ 208/417

(Continued)

FOREIGN PATENT DOCUMENTS

AT    404258 B    10/1998
DE    3309772     9/1984
(Continued)

OTHER PUBLICATIONS

Machine translation of JP 2002-166241 published Jun. 2002.*
(Continued)

*Primary Examiner* — George Wyszomierski
*Assistant Examiner* — Tima M McGuthry Banks
(74) *Attorney, Agent, or Firm* — Lucas & Mercanti, LLP

(57) ABSTRACT

The invention is directed to a process and apparatus for recovering metals from bottom ash from incineration plants, such as municipal waste incineration plants. The process includes directing a feed containing ash into an oxidizing unit, wherein at least part of the metals is oxidized in the presence of one or more acids and at least one oxygen donor, thus producing a stream comprising metal ions. From this stream the metals of interest are selected and converted into metallic form.

12 Claims, 1 Drawing Sheet

(51) Int. Cl.
*C22B 3/02* (2006.01)
*C22B 3/04* (2006.01)
*C22B 3/20* (2006.01)

(56) References Cited

U.S. PATENT DOCUMENTS

| | | | |
|---|---|---|---|
| 5,354,358 A | 10/1994 | Litz et al. | |
| 2007/0166225 A1* | 7/2007 | Johnson et al. | 423/658.5 |
| 2009/0183997 A1* | 7/2009 | Marsden et al. | 205/580 |
| 2011/0251449 A1* | 10/2011 | Zwahr | 588/321 |

FOREIGN PATENT DOCUMENTS

| | | | | |
|---|---|---|---|---|
| EP | 0274059 | | 7/1988 | |
| EP | 0616039 | | 9/1994 | |
| EP | 0654547 | | 5/1995 | |
| EP | 1354968 | | 10/2003 | |
| FR | 2826878 | | 1/2003 | |
| GB | 1491851 | | 11/1977 | |
| GB | 2176207 | | 12/1986 | |
| JP | 54007778 A | * | 1/1979 | |
| JP | 61284538 | | 12/1986 | |
| JP | 06170354 A | * | 6/1994 | |
| JP | 2002166241 A | * | 6/2002 | B09B 3/00 |
| JP | 2002205030 A | * | 7/2002 | B09B 3/00 |
| JP | 2003027272 A | * | 1/2003 | |
| JP | 2003201589 | | 7/2003 | |
| WO | 98/14623 | | 4/1998 | |
| WO | 98/58090 | | 12/1998 | |

OTHER PUBLICATIONS

Database WPI Week 200266, Thomson Scientific, London, GB, AN 2002-611880, XP002616117, JP 2002 166241, 2002.

* cited by examiner

HYDROMETALURGICAL PROCESS AND APPARATUS FOR RECOVERING METALS FROM WASTE MATERIAL

CROSS-REFERENCE TO RELATED APPLICATIONS

This application is a 371 of PCT/NL2010/050657, filed Oct. 6, 2010, which claims the benefit of NL Application No. 2003595, filed Oct. 6, 2009, the contents of each of which are incorporated herein by reference.

FIELD OF THE INVENTION

The invention is directed to a process and apparatus for recovering metals, in particular for recovering metals from ash from incineration plants, such as municipal waste incineration plants.

BACKGROUND OF THE INVENTION

Incineration of waste materials generally produces bottom ash and flue gases, which may contain particulates. These particulates are called flue dust or fly ashes. These fly ashes are mainly composed of calcium oxide, silicon dioxide and various metal oxides. Normally, the flue gases are subjected to a cleaning step prior to venting into the atmosphere. The bottom ash contains all non-combustible material, typically salts and metals. The metals may be present in their neutral (metallic) form and/or as salts, in which the metals are present in the form of ions. Its composition depends strongly on the feed of the incineration process.

In the art the bottom ash from incineration plants is usually disposed of by dumping or using the material for construction purposes after immobilizing the leachable compounds, e.g. by packing the ash in bentonite.

The availability of metals such as copper has been dropping in recent years as a result of rising demand and the exhaustion of natural resources.

Present methods recover valuable metals such as copper from waste materials using extraction methods based on a combination of magnetic and mechanical extraction. These known methods are not very efficient for removing particles having sizes below 4 mm and are considered infeasible for particle sizes below 1 mm. Furthermore, these magnetic/mechanical methods generally produce scrap metal mixtures, which need to be further refined before they can be reused. Moreover, these methods omit the metal salts, which are the main cause of environmental issues, such as ground water pollution, when above mentioned ashes are used for construction purposes.

EP-A-0 274 059 describes a process for the recycling metals from pyrolysed electrical batteries, assembled print circuit boards and electronic components using electrolysis. The metals collected during the electrolysis step described in EP-A-0 274 059 are then separated from each other following the electrolysis step using known metallurgical or electrochemical methods. However this process has the disadvantage that a further processing step is required to separate the metals following electrolysis. Also, the process of EP-A-0 274 059 is limited in its use to electrically conductive input streams. The present invention seeks inter alia to provide a method that is more versatile so that it may be used also for processing streams that are not, or only slightly electrically conductive. This is in particular the case for bottom ash, which is not electrically conductive.

SUMMARY OF THE INVENTION

The present invention seeks to overcome some of the disadvantages of processes currently used and provide a process and an apparatus to recover valuable metals, including but not limited to copper, tin, gold, silver, zinc, lead, platinum, and mixtures thereof, from sources of low or no non electrical conductivity, such as bottom ash streams produced by incineration processes.

It was found that this object can be met by providing a process for recovering one or more metallic metals from a waste stream of ash containing said metals, which process comprises:
  feeding said waste stream of ash to a leaching or oxidizing unit, wherein at least part of said metallic metals is oxidized in the presence of one or more acidic substances and at least one oxygen donor, thus producing a stream comprising the corresponding metal ions;
  concentrating one or more metal ions from said stream comprising them, thus producing a stream of concentrated metal ions;
  reducing at least part of the metal ions from said stream of concentrated metal ions, thus producing said one or more of metals in metallic form.

DETAILED DESCRIPTION OF THE INVENTION

Figure 2:
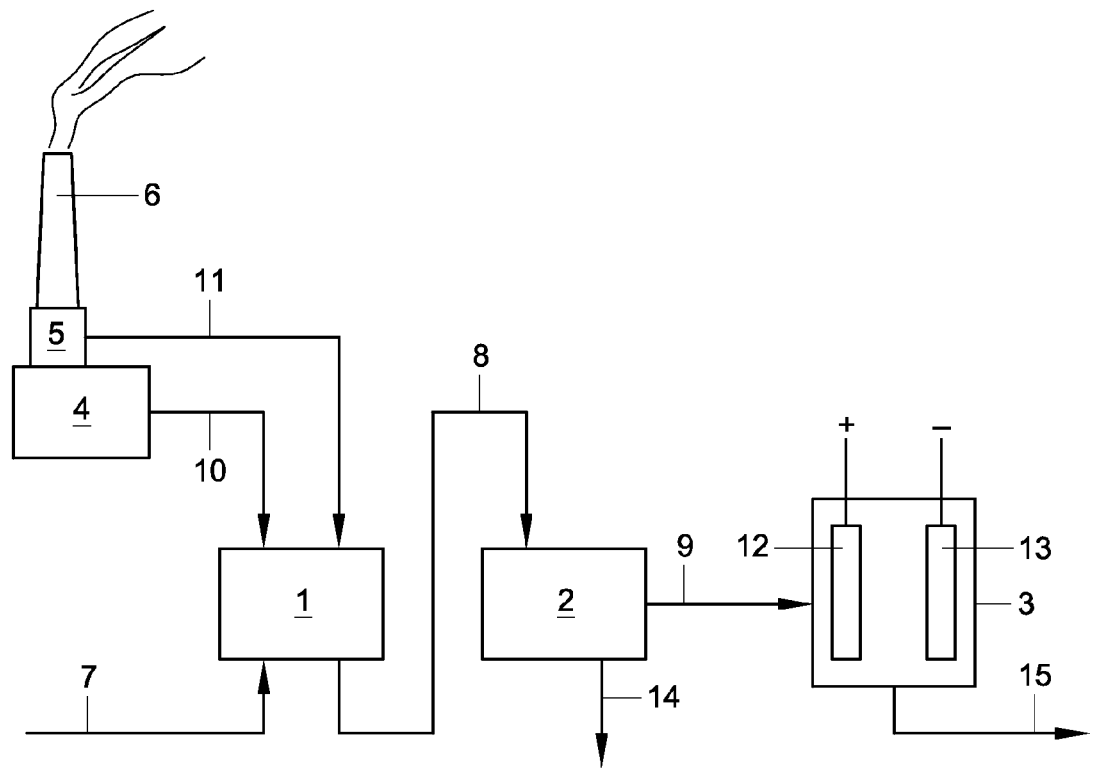
FIG. 2 is a schematic diagram of a waste stream treatment in accordance with the invention.

The waste supply stream of ash preferably is the bottom ash from an incineration plant and more preferably an incineration plant for municipal waste. The process of the invention is particularly suitable for treating bottom ash because bottom ash contains economically significant levels of metals and is produced in large quantities.

The metals of interest are present in the ash that is used as a feed for the present invention in their metallic, their oxidized form or other salt form. Usually, the ash contains several different types of metals, e.g. mixtures of copper and other metals. The present inventors realized that typically the metals of interest, in particular copper, are frequently present in a metallic form, viz. not as a salt or as ions, and that in order to select this metal and concentrate it, it is needed to carry out an oxidation step first, which is most effectively carried out in the presence of an acid and oxygen, since this greatly accelerates the oxidation reaction. The process carried out in the oxidation step is also known as leaching. Leaching is generally used to dissolve metal salts in aqueous media. Leaching is advantageous because it is relatively easy to perform and gaseous pollution is minimized. Although the leaching is said to have a low efficiency, the present inventors realized that this is not prohibitive for the object of the present invention.

In the art, leaching is usually performed on sulfide or oxide ores, with the notable exception of gold. Ores containing metallic or native metals are usually treated with gravity methods or the aforementioned mechanical methods, as they cannot be significantly leached with the traditional methods within appreciable time. The present invention is therefore characterized in that it treats waste streams containing metallic metals.

Unlike some existing hydrometallurgical methods which leach metallic metals from waste streams, such as a recovery process of zinc from the thin zinc coating on galvanized steel like U.S. Pat. No. 6,878,356, the present invention accelerates the oxidation of the metallic metal with an acidic substance and an oxygen donor, thereby making it feasible to dissolve not only thin coatings, but also larger pieces of metal.

The first step, where the metal is oxidized, can take place under acidic conditions or for some metals also under alkaline conditions, as the term acidic substance as used herein refers to either a substance that dissociates in water to yield hydrogen ions ($H^+$) or a substance that can accept a pair or electrons, i.e. a Lewis acid. The half reaction here is for example for hydrogen ions:

$$2H^+ + \tfrac{1}{2}O_2 + 2e^- \rightarrow H_2O \tag{1}$$

Under alkaline aqueous conditions, the equivalent half reaction is sometimes written as follows:

$$H_2O + \tfrac{1}{2}O_2 + 2e^- \rightarrow 2OH^- \tag{2}$$

The half reaction (1) is identical to (2) when to the left and right of the equation, one water molecule ($H_2O$) is removed and two hydroxide ions ($OH^-$) are added.

For the leach step to be feasible under alkaline conditions, the metal ions need to be dissolved in the alkaline solution in significant quantities. To be economically feasible, currently at least 1 to 5 g/L is needed for copper. To dissolve the metal ions in an alkaline solution, forming metal complexes is a suitable approach.

For some metals, such as zinc or lead, the hydroxide ions themselves can form complexes with the metal ions, for example producing the water soluble zincate. Currently, for an economical process the concentration of hydroxide ions needs to be very high to dissolve sufficient metal ions, i.e. 5-10 molar for zinc. The alkaline solution can be obtained by adding a basic substance which may comprise soluble salts, such as sodium or potassium hydroxide.

For transition metal ions, such as copper, zinc and silver, ammonia can be used to complex the metal ions and make them more soluble. For other metals, other water soluble chelating agents can be used to complex the metal ions, examples are EDTA and $D_2EHPA$ (di(2-ethylhexyl)phosphate acid). The use of ammonia or other chelating agents is more advantageous than using hydroxide to complex the metal ions, as the concentration of hydroxide ions need not be so high, and as the solvent is water, therefore the concentration of hydrogen ions can be higher. This increases the reaction rate of half reaction (1), as more reactant hydrogen ions are available. To increase the concentration of these hydrogen ions, an acid can be added to the solution, such as hydrochloric acid, dissolved carbon dioxide, or sulfuric acid.

When the feed stream has a high carbonate salt contents, such as bottom ash, and the required product is copper or zinc, using a combination of ammonia solution and dissolved carbon dioxide is highly advantageous. The dissolved carbon dioxide forms carbonic acid and with the solid carbonate salts, the solution is pH buffered around a pH of 9. This way, the large emissions of carbon dioxide, which occurs at lower pH, is avoided. Furthermore, about 50% of the dissolved ammonia is protonated at a pH of 9 to form ammonium ions: a very suitable hydrogen ion source for half reaction (1). The remainder dissolved ammonia can then be used to complex the copper or zinc ions. Thirdly, the ammonia selectively complexes the required product, while the dissolved carbon dioxide precipitates with unwanted ions. This reduces waste water significantly. And fourthly, carbon dioxide is amply available at incineration processes.

With great advantage, the acid is obtained from an off-gas treatment step, viz. a step in which harmful components, such as $NO_x$, chlorine, metal oxides, and sulfur oxides (notably $SO_2$ and $SO_3$) are removed from the off-gas of for example a waste incinerator. In these known off-gas treatment steps, the polluted gas stream is typically contacted with a liquid, for instance by scrubbing the gas with a liquid in a wet scrubber, by spraying the liquid through the gas, by forcing the gas through a pool of liquid, or by some other contact method. The acids are created in the process of neutralizing the corrosive gases. For example, when chlorine containing products, such as polyvinyl chloride (PVC) are incinerated, HCl gas is formed, which creates the hydrochloric acid when in contact with water. These off-gas treatment operations commonly result in streams of acid, preferably strong acids, such as sulfuric acid, hydrochloric acid and combinations thereof. Since normally the off gas treatment is carried out on site, directly after the incineration has taken place, these acids streams can be put to use with great economic advantage. An added advantage is that they do not have to be treated in waste water treatment plant at great costs.

As mentioned above, it was further found that applying oxygen in the form of air helps to accelerate the oxidation reaction of the metallic metals. Typically the following reaction occurs, wherein copper is used as an example:

$$Cu + 2H^+ + \tfrac{1}{2}O_2 \rightarrow H_2O + Cu^{2+} \tag{3}$$

Additionally, blowing the air in the unit provides for an excellent mixing in the oxidation step, which is carried out in the liquid phase. By allowing air to flow through the oxidizing unit, the oxidation step can thus be considerably sped up.

Alternatively, or in addition, a liquid oxidizing donor such as hydrogen peroxide may be used. Any copper in the supply stream acts as a catalyst, liberating the oxygen from the hydrogen peroxide. This way, the availability of oxygen increases and the reaction rate is increased. The hydrogen peroxide itself can also act as an oxidizing agent, with the following reduction reaction:

$$H_2O_2 + 2H^+ + 2e^- \rightarrow 2H_2O \tag{4}$$

However, contrarily to what may be expected, reaction (4) does not promote the leaching of metal ions like copper or nickel. Instead, a protecting passive layer is formed on the surface of those metals, preventing further significant leaching of them. Therefore, it is highly desirable to follow a correct order of adding reagents when using hydrogen peroxide as oxidizing donor. To this end, first the waste stream is immersed in a solution containing the acid or chelating agent, for example ammonia. Only then the hydrogen peroxide is added.

The leaching or oxidation is carried out in an aqueous medium at suitable conditions. The leaching progresses faster at higher temperatures, but due to energy usage considerations the temperature is preferably 20 to 30° C. When surplus heat of the incinerator is available, the preferred temperature is 60 to 80° C. The pH of the leaching solution when not using a chelating agent is preferably between −1 to 4, more preferably from −1 to 1. The pH of the alkaline solution is preferably about 8-10, more preferably 9, which ensures that all the carbonates from the bottom ash remain in a solid form, while ensuring sufficient hydrogen ions are available for the reaction.

This results in high metal concentrations, for example in copper concentrations of 1-10 g/L.

After the metallic metals are at least partly oxidized, preferably to a considerable extent, e.g. 99% (based on weight) or more, the desired oxidized metal needs to be selected and concentrated. This is preferably done in a separate unit, in particular in a solvent extraction unit. It is also possible to feed the effluent directly to the electrowinning step and choose conditions in the electrowinning step such that a selection and concentration of the desired metal is obtained, either in oxidized form or in metallic form; however, in practice this is usually not easily accomplished. Solvent extraction is a liquid-liquid extraction and is a method to separate compounds based on their relative solubilities in two different liquids, which liquids are immiscible or poorly miscible with each other. Usually water and an organic solvent are used as the liquids. Usually a complexing agent is used to selectively extract the desired metal from solution that is obtained after the leaching step. The metal can be recovered from it in a concentrated form after leaching. The result is an extraction of one substance from one liquid phase into the other liquid phase.

A very suitable extractant for this purpose is LIX 84™, which is commercially obtainable from Cognis corporation. The desired metal is extracted from the pregnant leaching liquid into the organic extractant by mixing the two liquids and, after settling, the two liquids are separated by gravity. Next, the metal is stripped from the extractant with a concentrated acid against the concentration gradient, using a similar process of mixing and settling. This mixing and settling can, for example, be performed in a multiple stage mixer-settler setup, pulsed column, or other apparatus.

In the final step of the process of the present invention, the metal ions are reduced to form metal deposits in metallic form. Preferably this is done by subjecting a concentrated effluent containing substantially one single metal in oxidized form, e.g. $Cu^{2+}$ ions to the reduction step. Preferably this step is carried out using a galvanic cell, wherein a pair of a negative cathode and a positive anode is present. The metal ions are reduced on the cathode, thus forming a metal deposit thereon, which can later be easily removed. In one embodiment, the electrowinning step is carried out using the process and device described in WO-A-98/58090.

WO-A-98/58090 describes a method and device for recovering metals from a flow using an electrochemical cell. WO-A-98/58090 also does not describe or suggest any method of selecting ions of interest, nor that this may be achieved by means of solvent extraction.

Figure 1:
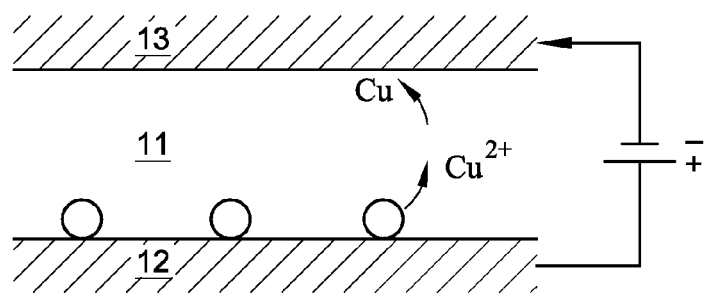
FIG. 1 is a schematic diagram showing application of external voltage to metal grains in a waste stream.

In a preferred embodiment, the leaching (viz. the oxidization of the metallic metal into their corresponding ions) is improved further by applying an external voltage to the metal grains in the waste stream, as schematically depicted in FIG. 1. This is particularly useful to plate at least part of the copper present in the solution. The remainder of the metals can be treated with the separate solvent extraction and electrowinning steps. To apply the voltage, the ash is spread on a flat-shaped, nearly horizontal (for instance having an angle of inclination with the surface of less than 10°, preferably between 4°-8°) inert anode, such that the metal grains touch the anode plate. The anode plate needs to be somewhat horizontal to support the ash. A small incline is useful to transport the ashes, e.g. after shaking the ashes move. The anode can be shaped, such that the contact area with the metal grains is maximized, e.g. by providing it in the form of a gauze structure. It may for instance be made from a titanium alloy, e.g. ASTM grade 7 titanium. This anode is placed together with a cathode in a vessel filled with an acid and additives, for example sulfuric acid with dissolved copper sulfate and small amounts of chloride and other additives. The cathode, for example made from Type 316 stainless steel, is located at a short distance, typically several centimeters, e.g. from 1-5 cm, above the anode. A controlled voltage difference (preferably between 0.1 to 1 V, e.g. around 0.3 V) is applied on the two electrodes, which will result in fast leaching (dissolving) of the metallic metals, viz. oxidizing them into their corresponding ions. At the cathode the copper ions will directly plate. This embodiment is highly advantageous, because of the simplicity of the set up. In fact, in this embodiment, the three steps of oxidation, selecting and plating the ions to their corresponding metals are combined in a single piece of equipment.

The concentration of copper ions needs to be kept constant or substantially constant in the above setup. However, copper ions are expended for every non-copper metal that is leached, the leaching of iron follows the reaction: 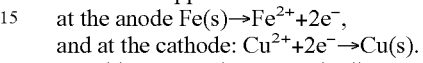, which depletes the electrolyte of Cu.

In more detail, the following two half-reactions take place for iron and copper:

at the anode $Fe(s) \rightarrow Fe^{2+}+2e^-$, and at the cathode: 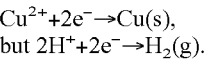.

For this reason, in one embodiment, first the less noble metals in a leach fluid are leached, optionally also accelerated by the setup where the ashes are spread on the anode and cathode, but without dissolved copper sulfate. In that case the half-reaction at the cathode is not $Cu^{2+}+2e^- \rightarrow Cu(s)$, but $2H^+ + 2e^- \rightarrow H_2(g)$.

The metallic metals that oxidize can be treated with the subsequent solvent extraction and electrowinning steps. When the applied electrical potential is sufficiently low (less than 0.34 V), half noble metals, such as copper, and noble metals, such as silver and gold, remain in solid form, and can therefore be treated in a leaching stage with copper sulfate according to the above mentioned method.

The acid that is expended can be obtained from wet gas scrubbers.

FIG. 2 is a schematic representation of one embodiment that is suitable for carrying out the present invention. In FIG. 2, a waste stream of ash (10) that is produced in incinerator (4) is fed to oxidizing unit (1), wherein metal atoms are oxidized to their corresponding ions by feeding oxygen rich feed (7) and acid feed (11). In FIG. 2, acid feed (11) originates from the gas effluent treatment step (5) of the incinerator process, while the cleaned flue gas of the incinerator process is vented through chimney (6). The effluent (8) of oxidizer (1) is fed to solvent extraction unit (2), which is an example of carrying out the required selection and concentration of the desired metal ions. Effluent (9), containing a high concentration of ions of the desired metals is fed to electrowinning step (3). Effluent (14) of the solvent extraction step can be subjected to a separate extraction step to extract other ions for further processing. In electrowinning step (3) an anode (12) and a cathode (13) are used to reduce the metal ions into their metallic form. Effluent (15), now containing a lower concentration of ions, is returned to solvent extraction unit (2) for reuse.

EXAMPLE

Two different experiments were performed on waste incinerator bottom ash, with a dry weight of 150±5 kg. 150 kg of 10 w % ammonia dissolved in water was added in a column with a diameter of 45 cm and a height of 2 m. In these experiments no acid was added, which resulted in an increase of pH due to acid consumption. In the first experiment air was bubbled through from the bottom of the column with a KNF Laboport™ 60 W diaphragm pump. In the second experiment the leach fluid was pumped through the column with two Prominent™ diaphragm pumps and hydrogen peroxide was continuously added to the recycled leach fluid. In the table below the amounts of leached metals are displayed.

| Experiment | Day | [Cu] (mg/kg)* | [Zn] (mg/kg)* |
|---|---|---|---|
| 10 w % $NH_3$ + Air | 6 | 1329 | 812 |
| 10 w % $NH_3$ + Air | 13 | 2356 | 1096 |
| 10 w % $NH_3$ + Air | 17 | 2882 | 1205 |
| 10 w % $NH_3$ + $H_2O_2$ | 6 | 1612 | 783 |
| 10 w % $NH_3$ + $H_2O_2$ | 13 | 2780 | 1082 |

*Based on dry matter

For these experiments the solvent extraction step was not included. When the solvent extraction was included, a faster leaching was observed.

In a separate setup the pregnant leach fluid was fed through the solvent extraction unit and a rich copper sulfate electrolyte containing 18560 ppm copper was successfully produced from dilute sulfuric acid. From this electrolyte a cathode was plated with copper.

The invention claimed is:

1. Process for recovering one or more metallic metals from a waste supply stream containing them, which waste supply stream is a bottom ash stream from an incineration plant for municipal waste, which process comprises:
feeding said waste supply stream to an oxidizing unit, wherein at least part of said metallic metals is oxidized in the presence of one or more acidic substances, at least one oxygen donor and optionally a complexing agent, thus producing a stream comprising metal ions; followed by the steps of
concentrating one or more of said metal ions from said stream comprising them, thus producing a stream of concentrated metal ions;
reducing at least part of the metal ions from said stream of concentrated metal ions, thus producing said one or more metals in metallic form.

2. Process according to claim 1, wherein said oxygen donor is an oxygen containing dissolved gas, or a liquid.

3. Process according to claim 2, wherein the gas is air.

4. Process according to claim 2, wherein the liquid is hydrogen peroxide.

5. Process according to claim 1, wherein the oxidation of said metallic metals is accelerated by an induced electrical potential by which the metals are made anodic.

6. Process according to claim 1, wherein part of the metals is reduced on a cathode in the oxidizing unit, thus producing said metals in metallic form.

7. Process according to claim 1, wherein said one or more acidic substances are selected from the group consisting of $H_2SO_4$, HCl, $HNO_3$, $CO_2$ and combinations thereof.

8. Process according to claim 1, wherein said waste supply stream includes one or more complex forming basic substances selected from the group consisting of sodium hydroxide, potassium hydroxide and ammonia.

9. Process according to claim 1, wherein said step of concentrating one or more metal ions is carried out in a solvent extraction step.

10. Process according to claim 1, wherein said step of reducing at least part of the metal ions from said stream of concentrated metal ions is carried out in an electrowinning step.

11. Process according to claim 1, wherein said metallic metal is copper.

12. Process according to claim 1, wherein said one or more acidic substances are obtained from a flue gas treatment step of an incineration plant that produces bottom ashes.

* * * * *